United States Patent [19]

Maeda et al.

[11] Patent Number: 4,571,479
[45] Date of Patent: Feb. 18, 1986

[54] WELDING MACHINE WITH AUTOMATIC SEAM TRACKING

[75] Inventors: Susumu Maeda; Masakazu Taki; Kenji Yoshizawa, all of Amagasaki, Japan

[73] Assignee: Mitsubishi Denki Kabushiki Kaisha, Tokyo, Japan

[21] Appl. No.: 588,418

[22] Filed: Mar. 12, 1984

[30] Foreign Application Priority Data

Mar. 14, 1983 [JP] Japan ................................. 58-41802
Mar. 30, 1983 [JP] Japan ................................. 58-54143
Jul. 26, 1983 [JP] Japan ................................. 58-136304

[51] Int. Cl.$^4$ ............................................. B23K 9/12
[52] U.S. Cl. ............................. 219/124.34; 318/576; 318/653
[58] Field of Search .................... 219/124.34, 124.22; 318/576, 653, 656

[56] References Cited

U.S. PATENT DOCUMENTS

| | | | |
|---|---|---|---|
| 3,268,805 | 8/1966 | Normando | 219/124.34 |
| 3,482,644 | 12/1969 | Krieger et al. | 318/576 |
| 3,484,667 | 12/1969 | Wofsey | 219/124.34 |
| 4,124,792 | 11/1978 | Flora et al. | 219/124.34 |
| 4,206,391 | 6/1980 | Varacins | 318/576 |
| 4,215,299 | 7/1980 | Edwin et al. | 219/124.34 |
| 4,441,010 | 4/1984 | Cornu et al. | 219/124.34 |

FOREIGN PATENT DOCUMENTS

52-114452 9/1977 Japan .
58-38672 3/1983 Japan .

Primary Examiner—Clifford C. Shaw
Attorney, Agent, or Firm—Sughrue, Mion, Zinn, Macpeak and Seas

[57] ABSTRACT

An automatic tracking welding machine includes a pair of rotatably mounted sensors 6a, 6b disposed in advance of a welding torch 3 and coaxial therewith for detecting magnetic leakage flux across a weld line gap 10. The sensors are driven to equalize their outputs by a reversible stepping motor 15 supplied with drive pulses whose frequency is proportional to the sensor output difference up to a fixed limit, thereby implementing slowdown as the center or zero differential point is approached. Alternatively, a greater number of fixed sensors may be peripherally spaced around the torch housing and their outputs sequentially scanned and peak detected to track the weld line gap. In another embodiment a spaced pair of sensors 116a, 116b is laterally and bidirectionally driven by a reversible d.c. motor 123 supplied with a voltage proportional to the off-center distance detected by the sensors, thus also implementing slowdown as the zero point approaches. Hall effect sensor elements encased in a non-magnetic metal housing may be used to avoid sputtering damage. A single leakage flux sensor may also be employed and periodically scanned laterally across the weld line gap, whereby a peak or zero slope in its output would indicate centering.

9 Claims, 14 Drawing Figures

THE ABSOLUTE VALUE OF THE DIFFERENCE BETWEEN THE RESPECTIVE OUTPUT VOLTAGES OF THE MAGNETIC SENSORS 6a, 6b

WELDING MACHINE WITH AUTOMATIC SEAM TRACKING

BACKGROUND OF THE INVENTION

1. Field of the Invention

The present invention relates to an automatic welding machine in which weld line or seam tracking is performed by measuring the distribution of a magnetic field leaking out of a weld line gap between objects to be welded.

2. Description of the Prior Art

Conventionally, an automatic welding machine is known in which a welding torch, while advancing along a weld line, is automatically driven in a direction perpendicular to the weld line to detect and track it. For example, laid-open Japanese Patent application No. 114452/77 discloses a method in which magnetic flux generated by a welding arc and leaking from the weld line gap is detected to identify the weld line. This application also discloses an automatic welding machine which employs a method in which thermal residual magnetism induced in welding one surface is detected in welding the other surface to thereby identify the weld line.

Figure 1:
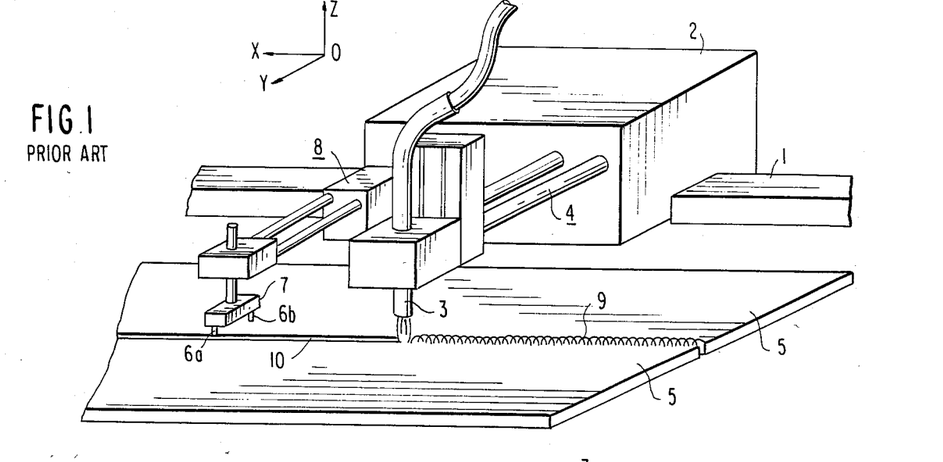
FIG. 1 is a perspective view of a prior art automatic welding machine.

FIG. 1 shows an automatic welding machine which employs the above-mentioned prior art method, in which a truck 2 is movable on a rail 1 in the X direction. A torch drive mechanism 4 is provided on the side of the truck, and a welding torch 3 is supported at its forward end to be movable in each of the X, Y, and Z directions. Objects 5 to be welded are placed opposite the torch such that a gap 10 defining a weld line 9 is parallel to the rail 1.

In order to weld while following the gap 10, a sensor mount 7 is disposed adjacent the objects to be welded and a pair of magnetic sensors 6a and 6b for detecting magnetic flux leaking from the gap are respectively mounted at opposite sides of the gap on the sensor mount 7. The latter is supported at the end of a sensor drive mechanism 8 provided on the side of the truck 2. The mechanism 8 is responsive to the magnetic leakage flux detected by the respective sensors 6a and 6b to drive them in a direction perpendicular to the welding direction to seek the position of maximum leakage corresponding to the position of the weld line. Movements of the sensors attendantly control the movement of the torch 3, as is conventional.

Figure 2:
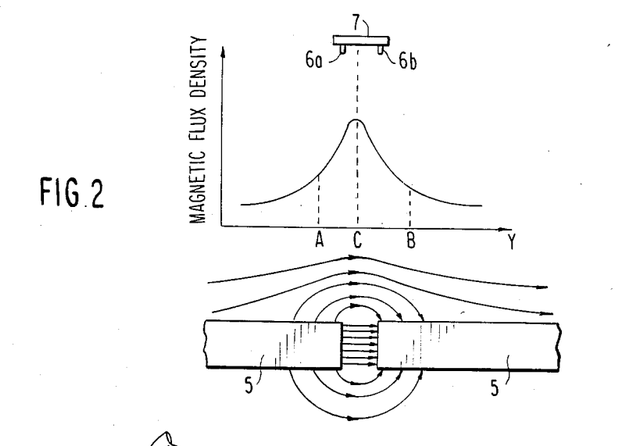
FIG. 2 is an explanatory diagram showing the magnetic flux density distribution and the flux flow lines in the objects to be welded.

During welding magnetic flux is induced by the current flowing from the torch 3 to the objects 5, and the density of this flux in the gap 10 is high when the objects are of a magnetic material. FIG. 2 shows the magnetic flux density distribution along the Y axis; as is apparent the flux density is maximum at the central portion C of the weld line gap 10, whereby automatic tracking can be performed by detecting the position of such maximum flux density. For example, the respective output signals of the sensors 6a and 6b may be fed to a comparator whose output in turn drives the sensor mount 7 in a direction to zero any difference between the sensor outputs. The X-Y coordinates of the detected maximum flux density position are stored as positional information so that welding can be performed by driving the torch 3 via the mechanism 4 to cause the torch to follow the weld line 9.

Such a conventional machine has disadvantages, however, in that since the mount 7, the sensors 6a and 6b, and the drive mechanism 8 are disposed separately from and in front of the welding torch 3 in the direction of travel, the structure is complicated and its ability to accurately track the weld line is limited. The conventional machine has a further disadvantage in that the driving of the sensors to bring their mid-point to the position of maximum flux density is always done at a constant speed regardless of the lateral error sensed, and it is thus impossible to smoothly stop the sensors at the desired position. The sensor mount 7 may thus hunt or oscillate until it is settled, resulting in poor tracking accuracy.

SUMMARY OF THE INVENTION

The present invention has been designed to eliminate the disadvantages in the prior art, and in a first embodiment a pair of sensors are spaced on the periphery of a circle coaxial with the welding torch and are rotatable thereabout. They are driven by a reversible stepping motor supplied with drive pulses whose frequency is proportional to the sensor output difference up to a fixed limit, thereby implementing slowdown as the center or zero differential point is approached. Alternatively, a greater number of fixed sensors may be peripherally spaced around the torch housing and their outputs sequentially scanned and peak detected to track the weld line gap.

In a second embodiment a spaced sensor pair mount is laterally and bidirectionally driven by a reversible d.c. motor whose supplied voltage is proportional to the off-center distance as detected by the sensors, thus also implementing slowdown as the center or zero point approaches.

Hall effect elements may be used as the leakage flux sensors in all embodiments, encased in a non-magnetic metal housing to avoid sputtering damage.

Instead of sensor pairs, a single flux sensor may be employed and laterally periodically scanned across the weld line gap; a peak or zero slope in its output signal would indicate centering.

DETAILED DESCRIPTION OF THE PREFERRED EMBODIMENTS

Figure 3:
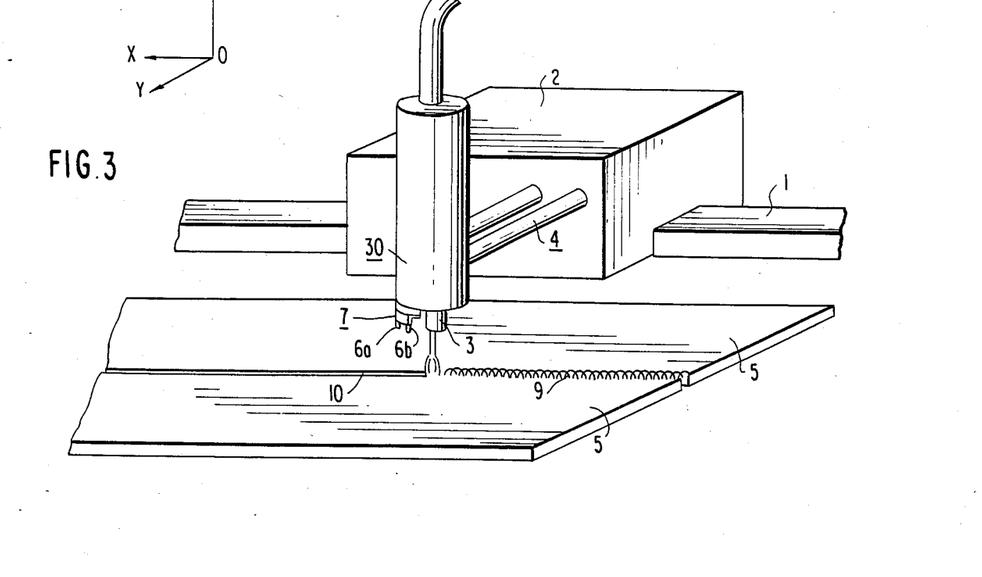
FIG. 3 is a perspective view of an automatic welding machine according to an embodiment of the present invention.

Referring to the drawings, in FIG. 3 a truck 2 is movable on a rail 1 in the X direction. A torch drive mechanism 4 is provided on the side of the truck for moving a welding torch device 30 supported at its end in the X, Y and Z directions. To perform weld line gap tracking a rotatable sensor mount 7 is provided along a circle coaxial with the torch device 30 around a welding torch 3 supported on the longitudinal axis of the device. A pair of magnetic sensors 6a and 6b for detecting magnetic flux leaking from the weld line gap 10 are disposed on the sensor mount 7 and on a circle coaxial with the welding torch.

Figure 4:
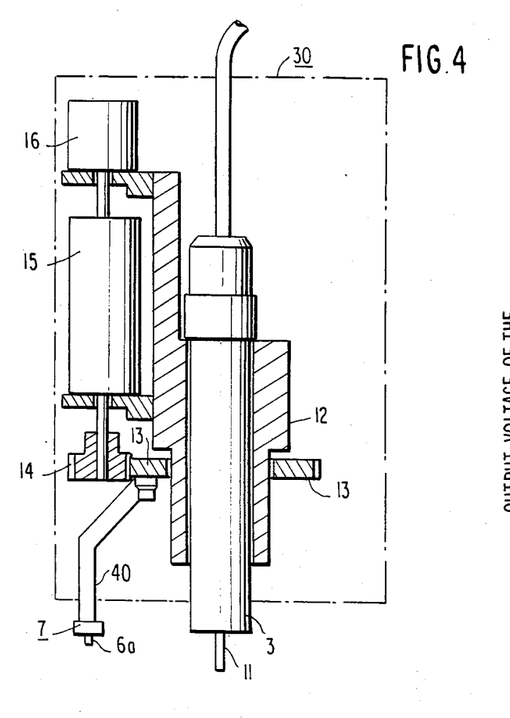
FIG. 4 is a side elevation partly in section of a welding torch provided with magnetic sensors according to the invention.

The sectional view of FIG. 4 shows a support 12 for the welding torch 3 having a welding wire 11 disposed at the center portion thereof, and a first spur gear 13 rotatably mounted around the support. A pulse motor 15 drives a second spur gear 14 which meshes with the first spur gear. A rotary encoder 16 detects the angle of rotation of the pulse motor. The sensor mount 7, on which the pair of magnetic sensors 6a and 6b are disposed, is mounted to the spur gear 13 by an arm 40.

In operation, during start the tip end of the welding wire 11 is brought directly above the weld line gap 10, a welding current is caused to flow to generate an arc discharge, and the truck 2 is moved in the X direction at a predetermined velocity. At this time leaking magnetic flux is generated with its maximum value at the center portion C as shown in FIG. 2. The sensor mount 7 is driven by the motor 15 and the first and second spur gears 13 and 14 such that the mid-point between the pair of sensors is positioned at the point of maximum leakage flux. That is, the respective output signals of the pair of sensors 6a and 6b are compared with each other as described later to drive the sensor mount 7 in the direction to zero the difference.

Figure 5:
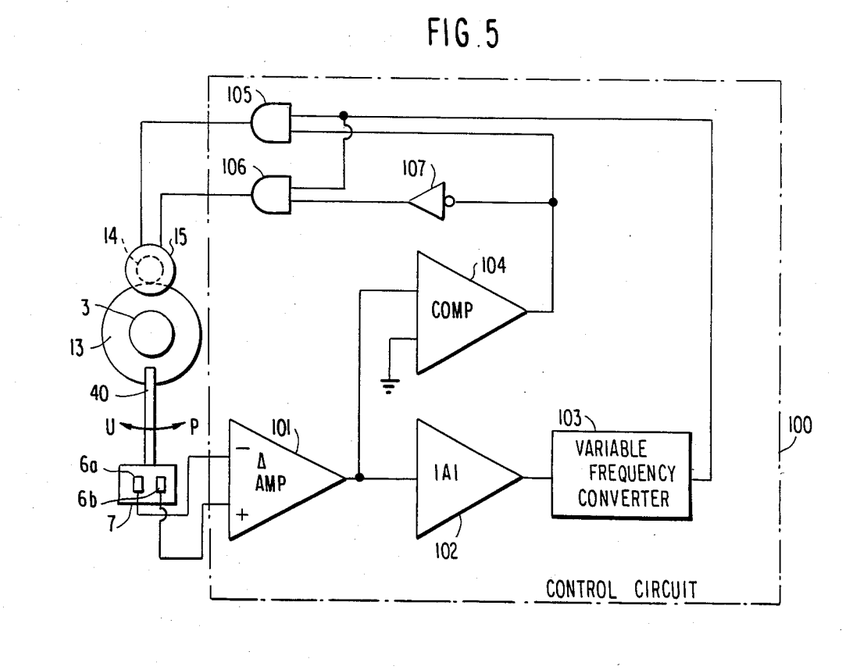
FIG. 5 is a circuit diagram of a sensor drive according to the invention.

In the circuit diagram of FIG. 5, a sensor drive or control circuit 100 comprises a differential amplifier 101 for amplifying the difference between the output voltages of the sensors 6a and 6b, an absolute value amplifier 102 for amplifying the absolute value of the output of the differential amplifier 101, a variable frequency or VF-converter 103 for producing pulses at a frequency in accordance with the output of the absolute value amplifier 102, a comparator 104 whose output level depends on the polarity (positive/negative) of the output of the differential amplifier 101, an AND gate 105 which is supplied with the respective outputs of the VF-converter 103 and the comparator 104, an inverter 107 for inverting the output of the comparator, and another AND gate 106 which is supplied with the respective outputs of the inverter 107 and the VF-converter 103. The pulse motor 15 is connected to the AND gates to receive their respective output pulses as forward and reverse rotation pulses.

The difference between the sensor outputs is amplified by the differential amplifier 101, such difference being obtained by subtracting the output of sensor 6a from that of sensor 6b. Thereafter the absolute value of the amplified difference value is further amplified by the absolute value amplifier 102. Accordingly, the output of amplifier 102 is a positive value corresponding to the magnitude of the difference between the sensor outputs, regardless of sign. The VF-converter 103 in the next stage produces pulses at a frequency proportional to the positive difference value. That is, the larger the difference between the outputs of the sensors 6a and 6b, the higher the frequency of the output pulses, and vice versa. The comparator 104 compares the output of the differential amplifier 101 with ground or zero, and alternatively produces high and low level outputs when the output of the differential amplifier 101 is positive and negative, respectively.

The AND gates 105 and 106 pass the variable frequency output or stepping pulses from the converter 103 to either the forward or reverse inputs of the motor 15 depending upon the output of the comparator 104. Accordingly, the sensor mount 7 is rotated around the welding torch 3 in the forward direction of arrow P in FIG. 5 when a pulse train is produced from AND gate 105, while it is rotated in the reverse direction of arrow U when a pulse train is produced from AND gate 106. The sensor mount 7 is thus automatically displaced toward the magnetic sensor whose output is largest. As the result of this operation, the sensor mount moves toward the magnetic sensor 6b when the mid-point between the pair of sensors comes to position A in FIG. 2, it moves toward the magnetic sensor 6a when the mid-point comes to position B, and it stops when the mid-point comes to position C. As the mid-point between the sensors approaches position C the difference between the respective outputs of the sensors decreases so that the output frequency of the VF-converter 103 also decreases. This slows down the pulse motor 15 to enable the mid-point between the sensors to stop smoothly at position C. Accordingly, the position of maximum leakage flux can be detected with high accuracy without allowing the sensor mount 7 to reciprocate or oscillate about position C.

Figure 6:
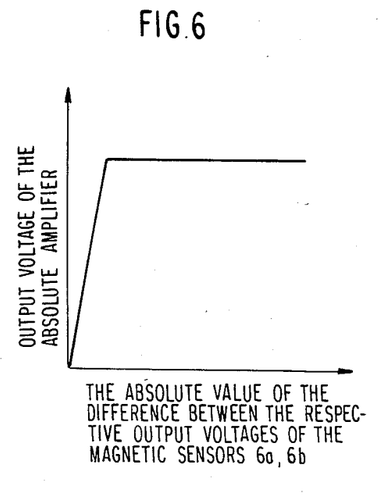
FIG. 6 is a graph showing the relation between the sensor output voltage difference and the output of an amplifier in FIG. 5.

If the differential amplifier 101 and the absolute value amplifier 102 are arranged such that the relation between the absolute value of the difference between the respective outputs of the magnetic sensors 6a and 6b (abscissa) and the output voltage of the absolute amplifier 102 (ordinate) shows a saturation characteristic as seen in FIG. 6, the mid-point between the sensors is initially driven toward position C of maximum leakage flux at a high speed, which sharply decreases immediately before the mid-point is reached such that the sensor mount stops gently. The thus obtained position of maximum magnetic flux density is stored in the form of rectangular coordinates, for example, in a storage device (not shown) as welding point information.

Figure 7:
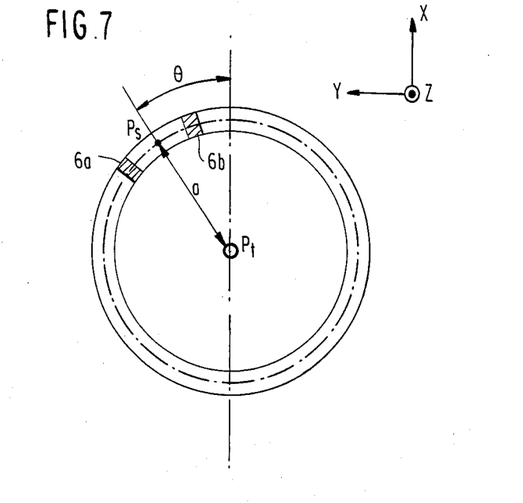
FIG. 7 is an explanatory diagram showing the positional relation between the welding torch and the weld line in accordance with the invention.
Figure 8:
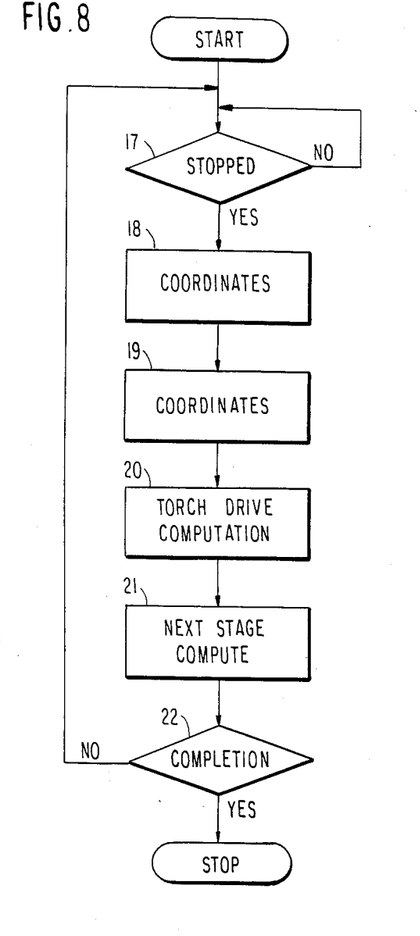
FIG. 8 is a flow-chart showing the operation of the automatic welding machine according to the invention.

FIG. 7 is an explanatory diagram showing the positional relation between the welding torch and the weld line in accordance with the invention. The position $P_t$ ($X_t$, $Y_t$) of the welding torch 3 can be detected by a potentiometer or the rotary encoder 16 of the truck 2 or the torch drive mechanism 4, respectively. The position $P_s$ ($X_s$, $Y_s$) of the weld line 9 specified by the sensors 6a and 6b can be easily determined from the following equations:

$$X_s = X_t + (a \cdot \cos \theta)$$

$$Y_s = Y_t + (a \cdot \sin \theta)$$

where a represents the attachment radius of the magnetic sensors from the welding torch 3, and $\theta$ represents the angle of the weld line 9 read by the rotary encoder 16. The thus specified positions $P_s$ ($P_{si-1}$, $P_{si}$, $P_{si+1}$, $P_{si+2}$ . . . ) are successively stored so that the welding torch device 30 is driven, for example, by using linear interpolation in accordance with the flow-chart of FIG. 8.

At first, at step 17, confirmation is made as to whether the welding torch device 30 has been stopped after displacement by a predetermined distance. At step 18 the present position $P_s$ of the weld line 9 is specified or identified by the magnetic sensors and the thus obtained data is stored. Next, in step 19, the present positional data $P_t$ of the welding torch device 30 is stored. Although the torch device is maintained stopped until this point of time because the position thereof has to be read, the time is too short to interfere with the traveling of the truck 2. In step 20 the torch driving condition computed in advance is instructed so that the torch device 30 is appropriately driven. While the torch is being driven, the torch driving condition in the next stage is computed in step 21 and a judgment is made in step 22 as to whether the welding has been completed or not; the operation is stopped if such judgment signifies the completion of welding. If the welding has not been completed, the operating procedure returns to the start step and the flow is repeated.

In the embodiment described above the magnetic sensors track the weld line and the sensor mount is rotated to equalize the sensor outputs. Alternatively, the machine may be arranged such that a single sensor is rotated along a given circle coaxial with the welding torch 3 at a given period, and the positions at which the output of the sensor becomes maximum are identified as the weld line 9. The maximum output position of the single sensor may be the position at which the differential coefficient, that is the gradient, of the sensor output signal becomes zero.

Figure 9:
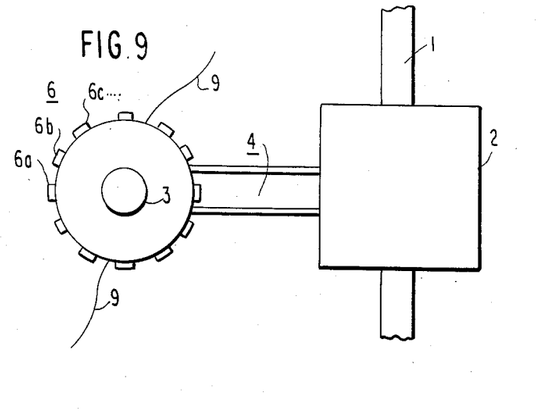
FIG. 9 is a top view of an automatic welding machine according to another embodiment of the invention.
Figure 10:
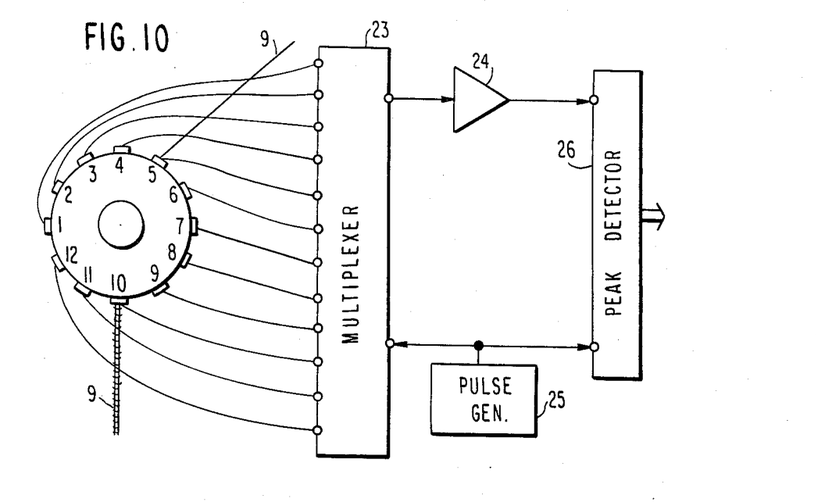
FIG. 10 is a circuit diagram for specifying the weld line by the magnetic sensors according to the embodiment of FIG. 9.

Although the sensors are arranged to be rotatable along a given circle coaxial with the welding torch 3 in the embodiment described above, a plurality of fixed magnetic sensors may be disposed at predetermined positions on a given circle coaxial with the welding torch 3 to thereby specify or track the weld line, as shown in FIG. 9. FIG. 10 shows a circuit for specifying the weld line by the sensor arrangement shown in FIG. 9. In this embodiment, a plurality of magnetic sensors 6a, 6b, for example twelve in number, are fixedly provided on a given circle coaxial with a welding torch 3, and the respective outputs of these twelve sensors are successively selected by a twelve-channel multiplexer 23 by pulses produced by a pulse generator 25. The output of the multiplexer 23 is applied to an amplifier 24. An example of the output waveform of the amplifier 24 is shown in FIG. 11 in which the ordinate represents the output of the amplifier 24 and the abscissa represents time.

Figure 11:
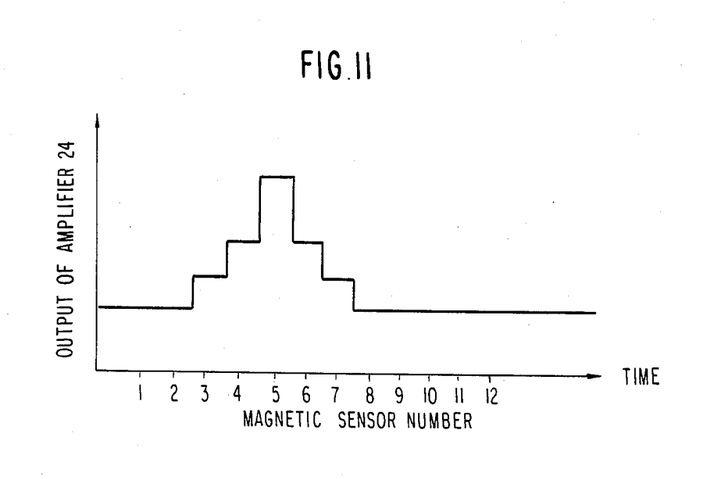
FIG. 11 is a diagram showing an example of the output signal of the amplifier in the embodiment of FIG. 10.

As seen in FIG. 11, the magnetic sensor No. 5 has the maximum or highest output, and the weld line 9 thus lies at its position. The positional information in connection with the weld line 9 is outputted through a peak position detector 26 so that the welding torch 3 is controlled on the basis of this positional information to thereby track the weld line. In this embodiment it is not necessary to rotate the magnetic sensors 6.

Although in the foregoing embodiments the mechanism 4 drives the welding torch 3 to make it track the weld line, alternatively the welding torch may be fixed and the objects 5 to be welded driven toward the torch to implement tracking.

Figure 12:
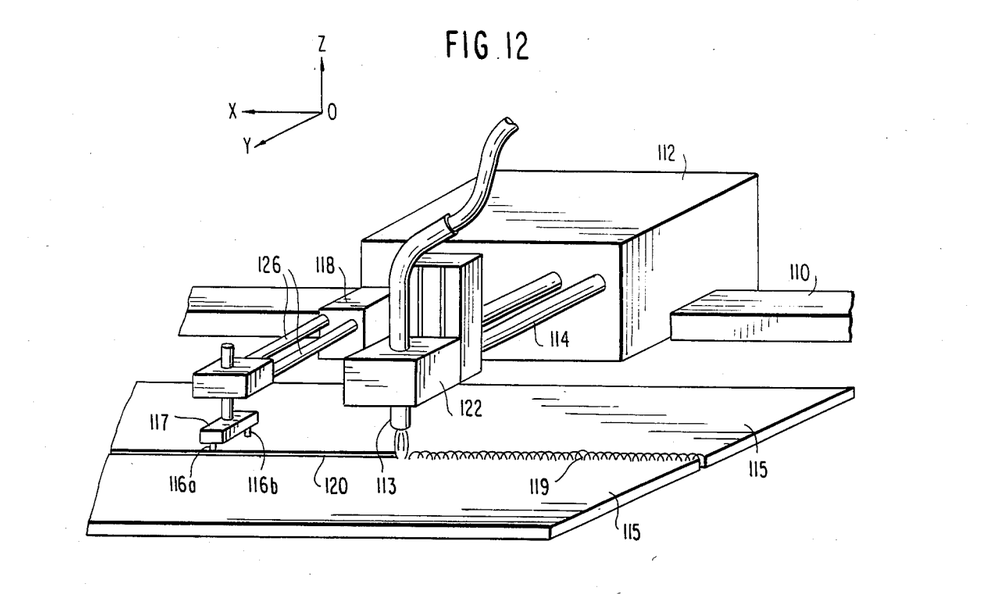
FIG. 12 is a perspective view of an automatic welding machine according to a further embodiment of the invention.
Figure 13:
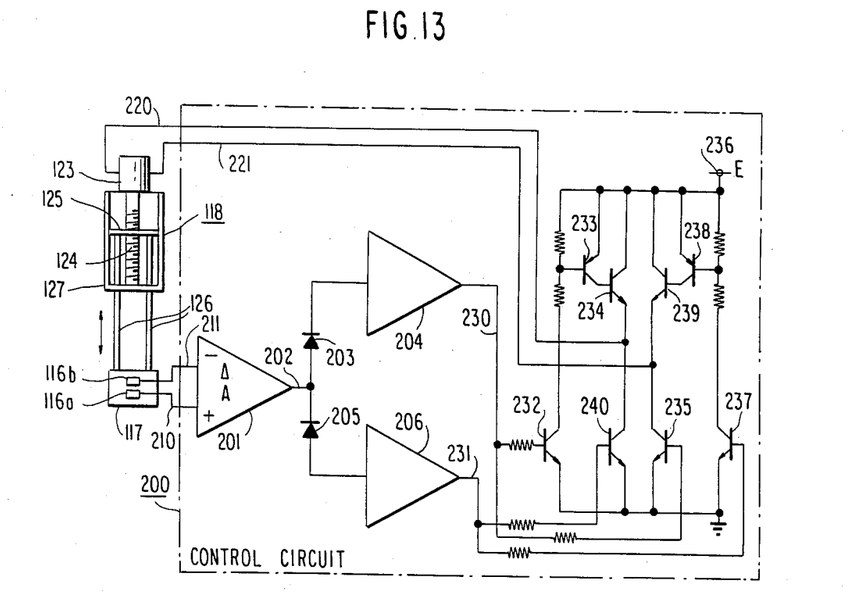
FIG. 13 is a circuit diagram of the embodiment of FIG. 12.

FIGS. 12 and 13 show a further embodiment of the invention in which the general outline of the welding machine is similar to that shown in FIG. 1. In FIGS. 12 and 13 a truck 112 is movable on rail 110 in the X direction, and a torch drive mechanism 114 is provided on the side of the truck so that a welding torch device 122 provided with a welding torch 113 may be displaced in the X, Y, and Z directions. Objects 115 to be welded are disposed opposite the torch 113 such that a welding gap 120 is parallel with the rail 110. To perform weld line gap tracking, a sensor mount 117 is provided with a pair of magnetic sensors 116a and 116b at the end of a drive mechanism 118 on the side of the truck 112. The mechanism 118 drives the magnetic sensors transverse to the gap 120 through a mechanism constituted, as shown in FIG. 13, by a d.c. motor 123, a feed shaft 124 which rotates integrally with the shaft of the motor 123, a feed plate 125 thread-engaged with the shaft 124, a pair of feed arms 126 connected to the plate 125, and a frame 127 in which the shaft 124 and the plate 125 are accommodated.

In this embodiment a magnetic sensor drive or control circuit 200 produces drive velocity signals 220 and 221 which are applied to the mechanism 118 to drive the sensors at a velocity corresponding to the respective positions of the sensors relative to the position of maximum leakage flux.

The circuit 200 includes a differential amplifier 201 for amplifying the voltage difference between the respective output signals 210 and 211 of the sensors 116a and 116b, with the output of sensor 116a being applied to the non-inverting input of the differential amplifier 201. A non-inverting amplifier 204 is supplied with the differential amplifier signal 202 through a diode 203 and an inverting amplifier 206 is supplied with the same signal through a diode 205. When the differential amplifier signal 202 is positive the diode 203 becomes conductive so that an amplifier signal 230 corresponding to the voltage of the differential amplifier signal 202 is produced by the amplifier 204 and applied to a transistor 232 to make transistors 232 ~235 conductive. Accordingly, a current flows from a source 236 through the transistor 234 to the d.c. motor 123 in the drive mechanism 118 to rotate the motor and drive the magnetic sensors in one direction.

When the differential amplifier signal 202 is negative the diode 205 becomes conductive so that an amplifier signal 231 corresponding to the voltage of the differential amplifier signal 202 is produced by the amplifier 206 and applied to a transistor 237 to make transistors 237~240 conductive. Accordingly, a current flows from the source 236 through the transistor 239 to the motor 123 to drive the sensors in the reverse direction.

In this circuit the resistance of each of the transistors 234, 235, 239 and 240 varies in accordance with the voltage difference between the detection signals 210 and 211. Such voltage difference becomes small as the mid-point between the sensors approaches the position of maximum leakage flux and becomes zero when this position is reached. Accordingly, when the mid-point between the sensors is considerably separated from the position of maximum flux, the sensors are driven at a relatively high velocity, while when the mid-point is in the vicinity of the maximum flux the sensors are driven at a relatively low velocity so as to be smoothly stopped at the centered or zero position.

Figure 14:
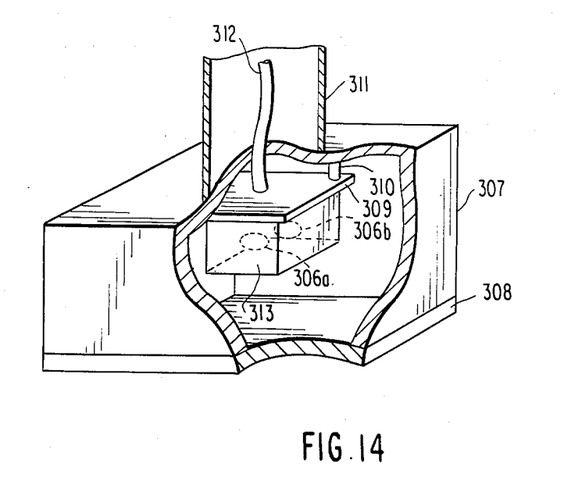
FIG. 14 is a perspective cut-away showing an embodiment of the magnetic detector device.

FIG. 14 shows an embodiment of the magnetic sensor device which is suitable to the automatic welding machine of the present invention, wherein a pair of Hall elements 306a and 306b are disposed side by side with a small separation. These magnetic sensor Hall elements are contained in a sensor case 307 which is made of a non-magnetic material, preferably metal. A non-magnetic cover 308 seals the lower opening of the sensor case. The Hall elements are attached to a plate 309 which is in turn attached to the case 307 through a support member(s) 310. The case 307 corresponds to the sensor mount in the above embodiments, and is provided with an attachment jig 311 for connecting it to, for example, the torch device 30 shown in FIG. 3 or the sensor driving mechanism 118 shown in FIG. 12. Signal lines 312 are led out from the Hall elements, which are attached to the plate 309 through a non-magnetic member 313.

In this arrangement, if the objects to be welded are of a magnetic material, leaking magnetic flux induced by the welding current flowing into the objects from the welding torch is detected by the Hall elements to thereby track the weld line in the manner described above.

Although a large amount of spattering is of course generated in welding, the spattering cannot directly attack the Hall elements since they are protected by the case 307 and the cover 308. The case and cover may be made of any kind of non-magnetic material which does not affect leaking magnetic flux, such as aluminum, copper, or the like. Accordingly, there is no risk of thermal deformation of the sensor case and cover. Although two Hall elements have been described, it is clear that only one Hall element as the magnetic sensor can be applied to this embodiment.

What is claimed is:

1. An automatic tracking welding machine, comprising:
   (a) an electrical arc generating welding torch (3) movably mounted relative to two objects (5) to be welded together and disposed opposite a weld line gap (10) defined by and between said objects;
   (b) a pair of magnetic detectors (6a, 6b) for detecting magnetic flux exclusively generated in the objects by the electrical arc current and leaking from said gap;
   (c) means (7, 40, 13) for rotatably mounting said detectors on a circle coaxial with said welding torch and circumferentially spaced from each other;
   (d) drive means (15) for rotating said magnetic detectors via said mounting means;
   (e) a control circuit (100) for producing and applying a drive signal to said driving means in response to output signals from said magnetic detectors to rotate said detectors to a centered position flanking the gap whereat their output signals are equal;
   (f) a rotary encoder (16) coupled to the drive means for producing an output proportional to the angle of rotation thereof; and
   (g) means for:
      (1) determining x and y coordinates of the centered detectors position on the basis of the encoder output and the radial distance between the torch and the detectors, and
      (2) displacing said welding torch to said determined coordinates such that said welding torch tracks the weld line gap,
   wherein said control circuit includes a comparator circuit (101) for comparing the output signals of said detectors, and a velocity instruction circuit (102, 103) responsive to the output of said comparator circuit for producing a first drive signal to drive said detectors at a predetermined high velocity in a direction to decrease any detector output difference when said difference exceeds a predetermined value, and a second drive signal to drive said detectors at a lower velocity corresponding to said difference when said difference is smaller than said predetermined value.

2. A machine according to claim 1, wherein said mounting means includes a first rotary body (13) disposed around said welding torch, and said drive means includes a second rotary body (14) for rotating said first rotary body.

3. A machine according to claim 2, in which said drive means for rotating said magnetic detector includes an electric motor.

4. A machine according to claim 2, in which each of said first and said second rotary bodies is a gear.

5. An automatic tracking welding machine, comprising:
   (a) an electrical arc generating welding torch movably mounted relative to two objects to be welded together and disposed opposite a weld line gap defined by and between said objects;
   (b) a plurality of equally circumferentially spaced magnetic detectors fixedly and non-rotatably disposed on a circle coaxial with said welding torch for detecting magnetic flux exclusively generated in the objects by the electrical arc current and leaking from said gap;
   (c) a control circuit responsive to respective output signals from said magnetic detectors for determining a position at which the detection signal of one of said magnetic sensors is largest to identify said position as the location of the weld line; and
   (d) means responsive to an output of said control circuit for displacing said welding torch to said determined position such that said welding torch tracks the weld line gap.

6. A machine according to claim 5, in which said control circuit includes a circuit for generating a pulse signal, a circuit for sequentially scanning outputs of said plurality of magnetic detectors in response to said pulse signal, and a peak detector circuit for receiving signals outputted from said scanning circuit to identify the position of said weld line gap.

7. A machine according to claim 6, in which each of said magnetic detectors includes at least one magnetic sensor and a container of a non-magnetic material surrounding said sensor.

8. An automatic tracking welding machine, comprising:
   (a) an electrical arc generating welding torch movably mounted relative to two objects to be welded together and disposed opposite a weld line gap defined by and between said objects;
   (b) at least two magnetic detectors (116a, 116b) disposed on opposite sides of said gap in a welding advance direction for detecting magnetic flux exclusively generated in the objects by the electrical arc current and leaking from said welding gap;

(c) a control circuit (200) for displacing said magnetic detectors in a direction transverse to the weld line gap in response to output signals from said detectors to position a mid-point between said detectors at a position of maximum leakage flux corresponding to the position of said weld line gap; and (d) means for displacing said welding torch relative to said objects in proportional accordance with displacements of said magnetic detectors to make said welding torch track said gap, said control circuit including a velocity instruction circuit for producing a detector drive signal proportional to the transverse displacement between said midpoint and the weld line gap.

9. A machine according to claim 8, in which each of said magnetic detectors includes at least one magnetic sensor and a container of a non-magnetic material surrounding said sensor.

* * * * *